(12) United States Patent  
Hurup et al.

(10) Patent No.: US 12,281,641 B2  
(45) Date of Patent: Apr. 22, 2025

(54) WIND TURBINE BLADE, A WIND TURBINE AND A METHOD FOR MANUFACTURING A WIND TURBINE BLADE

(71) Applicant: Siemens Gamesa Renewable Energy A/S, Brande (DK)

(72) Inventors: Allan Hurup, Nibe (DK); Michael Nauheimer, Aalborg (DK); Mogens Nielsen, Aalborg (DK); Michael Noerlem, Svenstrup (DK); Wei Sun, Gistrup (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/925,060

(22) PCT Filed: May 12, 2021

(86) PCT No.: PCT/EP2021/062637  
§ 371 (c)(1),  
(2) Date: Nov. 14, 2022

(87) PCT Pub. No.: WO2021/239468  
PCT Pub. Date: Dec. 2, 2021

(65) Prior Publication Data  
US 2023/0184225 A1      Jun. 15, 2023

(30) Foreign Application Priority Data  
May 27, 2020   (EP) .................................... 20176739

(51) Int. Cl.  
*F03D 80/30*    (2016.01)  
*B64D 45/02*    (2006.01)  
(Continued)

(52) U.S. Cl.  
CPC .......... *F03D 80/30* (2016.05); *F03D 1/0675* (2013.01); *B64D 45/02* (2013.01); *F03D 7/0268* (2013.01);  
(Continued)

(58) Field of Classification Search  
CPC ..................................................... B64D 45/02  
See application file for complete search history.

(56) References Cited

U.S. PATENT DOCUMENTS

2019/0195203 A1\* 6/2019 Fujioka ................. H02G 13/00  
2019/0211806 A1   7/2019 Girolamo  
(Continued)

FOREIGN PATENT DOCUMENTS

EP          3597911 A1    1/2020

OTHER PUBLICATIONS

International Search Report and Written Opinion for PCT/EP2021/062637 issued on Jul. 16, 2021.

*Primary Examiner* — Binh Q Tran  
(74) *Attorney, Agent, or Firm* — Schmeiser, Olsen & Watts LLP (57) ABSTRACT

A wind turbine blade for a wind turbine is provided, the wind turbine blade including: an electrical conductor for conducting lighting strikes towards a hub of the wind turbine, a fiber sock fully enclosing the electrical conductor when seen in cross-section, a support element, and at least one finger connecting the support element and the fiber sock, the fiber sock, the support element and the at least one finger being made of electrically conductive fibers for conducting lightning strikes from the support element to the electrical conductor. Such a fiber sock mitigates the risk of delamination around the electrical conductor resulting from injected high voltages in case of lightning strikes.

11 Claims, 6 Drawing Sheets

(51) Int. Cl.
  *F03D 1/06* (2006.01)
  *F03D 7/02* (2006.01)
(52) U.S. Cl.
  CPC ........ *F03D 80/301* (2023.08); *F05D 2230/90* (2013.01); *F05D 2240/14* (2013.01); *F05D 2300/603* (2013.01); *F05D 2300/614* (2013.01)

(56) References Cited

U.S. PATENT DOCUMENTS

| | | |
|---|---|---|
| 2020/0018284 A1 | 1/2020 | Christiansen et al. |
| 2020/0025178 A1* | 1/2020 | Christiansen ......... F03D 1/0675 |
| 2020/0291926 A1* | 9/2020 | Leong ..................... F03D 80/30 |
| 2021/0332799 A1* | 10/2021 | Girolamo ................ F03D 80/30 |
| 2021/0381494 A1* | 12/2021 | Aubrion ................ F03D 1/0675 |
| 2022/0243704 A1* | 8/2022 | March Nomen ....... F03D 80/30 |
| 2022/0411098 A1* | 12/2022 | Lane ...................... B64D 45/02 |
| 2022/0412319 A1* | 12/2022 | Martin ............... B29D 99/0025 |

\* cited by examiner

WIND TURBINE BLADE, A WIND TURBINE AND A METHOD FOR MANUFACTURING A WIND TURBINE BLADE

CROSS-REFERENCE TO RELATED APPLICATIONS

This application claims priority to PCT Application No. PCT/EP2021/062637, having a filing date of May 12, 2021, which claims priority to European Application No. 20176739.9, having a filing date of May 27, 2020, the entire contents both of which are hereby incorporated by reference.

FIELD OF TECHNOLOGY

The following relates to a wind turbine blade for a wind turbine and a wind turbine comprising such a wind turbine blade. Further, the following relates to a method for manufacturing a wind turbine blade for such a wind turbine.

BACKGROUND

Modern wind turbine rotor blades are built from fiber-reinforced plastics. Rotor blades may be made of two half-shells connected to each other. Further, a web, in particular a shear web, may be arranged between the two half-shells to reinforce the rotor blade. The shear web may be arranged between two beams or spar caps and may be connected thereto. The shear web, beams, and/or spar caps may extend in a lengthwise direction of the wind turbine blade and may comprise carbon fibers.

Rotor blades are the most exposed part of the wind turbine with respect to lightning strikes. Therefore, lightning protection systems (LPS) may be provided. A lightning protection system may comprise an electrical down conductor which may be connected to the web and which may extend along a lengthwise (spanwise) direction of the web. The down conductor may be electrically connected to a grounding system of the wind turbine blade. Further, receptors may be arranged along a blade surface and electrically connected to the down conductor. When a lightning strike is intercepted by the receptors, the electrical current is transferred to the grounding system by the down conductor.

SUMMARY

An aspect relates to an improved wind turbine blade.

According to a first aspect, a wind turbine blade for a wind turbine is proposed. The wind turbine blade comprises an electrical conductor for conducting lighting strikes towards a hub of the wind turbine, a fiber sock fully enclosing the electrical conductor when seen in cross-section, a support element, and at least one finger connecting the support element and the fiber sock, the fiber sock, the support element and the at least one finger being made of electrically conductive fibers for conducting lightning strikes from the support element to the electrical conductor.

Such a fiber sock mitigates the risk of delamination around the electrical conductor resulting from injected high voltages in case of lightning strikes. The fiber sock may also function as a reinforcement member for the electrical conductor which may be made of a material (e.g., copper) less strong or more prone to fatigue compared to (carbon) fiber composites.

Further, since the fiber sock fully encloses the electrical conductor, the fiber sock may function as a backup conductor for transferring electrical current in case of lightning strikes.

In an embodiment, the support element has a length which is at least 20, 30, 40, 50, 60, 70, 80 or 90% of a length of the wind turbine blade. The support element is, for example, configured to give structural rigidity to the wind turbine blade, thereby preventing, e.g., kinking or buckling of the wind turbine blade in stormy wind conditions. The support element may support at least one blade shell of the wind turbine blade by being connected directly or indirectly thereto. In an embodiment, an electrical conductivity of the support element is anisotropic, with an increased conductivity in the lengthwise direction of the support element. The lengthwise direction of the support element may be identical to the lengthwise direction (spanwise direction) of the blade.

The electrically conductive fibers (in particular carbon fibers) of the fiber sock, the support element and/or the at least one finger are, for example, embedded in a resin matrix and, for example, arranged parallel and, in particular, continuous. In an embodiment, the support element comprises a rectangular or trapezoidal cross-section having a broad side and a narrow side. In particular, the support element is a flat element.

The at least one finger overlaps with the support element and is attached thereto forming an overlapping portion. In case of lightning strike, electrical charge is transferred from the support element through the overlapping portion to the finger.

According to an embodiment, the fiber sock comprises multiaxial carbon fibers.

This has the advantage that the tensile strength of the fiber sock is increased in all directions. At the same time, the multiaxial fibers spread the electrical charge coming from the finger evenly over the circumference of the conductor.

In particular, the multiaxial fibers comprise triaxial carbon fibers. The triaxial carbon fibers may be woven from a plurality of triaxial carbon fibers or aramid fibers or from a combination of triaxial carbon fibers and aramid fibers.

According to a further embodiment, the wind turbine blade comprises at least two fingers both being made from electrically conductive fibers and connecting the support element and the fiber sock, wherein the fiber sock fully encloses the electrical conductor when seen in cross-section and over the full length between the at least two fingers.

Thereby, the electrical current may flow in a more evenly distributed fashion from the support element to the electrical conductor. The at least two fingers may be spaced apart in the lengthwise (spanwise) direction of the blade.

In particular, the at least one finger extends in the overlapping portion in a direction Z which is parallel to the lengthwise direction L of the support element. Also, the electrically conductive fibers of the at least one finger in the overlapping portion extends in the direction Z and are aligned with the electrically conductive fibers of the support element which extend in the lengthwise direction L. For example, the at least one finger extends in a free portion which is a portion between the support element and the fiber sock, in a direction Y, which is perpendicular to the direction Z. In an embodiment, the fiber sock enclosing the electrical conductor extends in a direction X which is parallel to the lengthwise direction L of the support element and parallel to the direction Z of the at least one finger in the overlapping portion and which is orthogonal to the direction Y of the free portion of the at least one finger.

In particular, the fiber sock partially or fully encloses the electrical conductor when seen in cross-section. In an embodiment, the electrical conductor is electrically connected to a lightning conductor. The lightning conductor is an electrically conductive (integral) part, portion, material or member of the support element. The electrical connection between the electrical conductor and the lighting conductor is obtained by way of the fiber sock electrically contacting the electrical conductor, the fiber sock being electrically connected to the finger, and the finger being electrically connected to the support element or lightning conductor thereof.

According to a further embodiment, a distance between the support element and the electrical conductor is between 10 mm and 3000 mm or larger than 150 mm.

This has the advantage that flashovers between the fiber sock enclosing the electrical conductor and the support element may be prevented. Further, the electrical conductor is decoupled from large strains which may occur in the support element.

According to a further embodiment, a distance between the at least two fingers is less than 500 mm, less than 400 mm, less than 300 mm, or less than 200 mm and/or larger than 50 mm or larger than 100 mm.

This has the advantage that redundant electrical connections between the fiber sock enclosing the electrical conductor and the support element are provided. Further, the electrical current is distributed over the at least two fingers leading to a lower current density for each finger. Therefore, arcs and flashovers may be prevented.

According to a further embodiment, the at least one finger is made of electrically conductive unidirectional carbon fibers.

Thereby, the anisotropic electrical conductivities of the electrically conductive fibers of the support element and the electrically conductive fibers of the at least one finger may be aligned in the overlapping portion. Thus, the current transfer through the overlapping portion is improved.

According to a further embodiment, the wind turbine blade comprises a further fiber sock which fully encloses the fiber sock when seen in cross-section, the at least one or two fingers being connected to the fiber sock via the further fiber sock.

By using the fiber sock and the further fiber sock the ability to carry electrical current and overall strength is increased.

In particular, the further fiber sock and the fiber sock are two different separated layers or components, each comprising multiaxial carbon fibers, in particular triaxial carbon fibers.

In particular, the further fiber sock partially or fully encloses the fiber sock when seen in cross-section.

Alternatively, instead of using the fiber sock and the further fiber sock at the same time, it is possible to implement one fiber sock around the electrical conductor with a higher density of fibers. In an embodiment, the density of fibers of the one fiber sock corresponds to the combined density of fibers of the fiber sock and the further fiber sock.

According to a further embodiment, the at least one finger comprises a weft thread which extends between the support element and the fiber sock for holding together the electrically conductive fibers of the at least one finger.

This means that the weft thread is provided wavelike and, additionally, arc-shaped. In an embodiment, weft threads bundle the fibers in the at least one finger together. In particular, the weft threads are provided as at least one fiber bundle, in particular carbon fiber bundle or glass fiber bundle. Alternatively, the fiber bundle may comprise polyester or urethane. According to a further embodiment, the support element is a spar cap.

In particular, the spar cap is connected to at least one blade shell and/or connected to a shear web arranged in the inside of at least one blade shell.

According to a further embodiment, the electrical conductor and/or the further electrical conductor is a metal cable, extending in the lengthwise (spanwise) direction of the wind turbine blade.

The electrical conductor is a braided metal cable or a metal stripe. In particular, the electrical conductor comprises aluminum, copper, steel and/or titanium. In an embodiment, the electrical conductor has a rectangular-like cross-section and/or a flat cross-section. The electrical conductor may also be referred to as LPS-cable.

Further, a wind turbine comprising such a wind turbine blade is provided.

Wind turbine presently refers to an apparatus converting the wind's kinetic energy into rotational energy, which may again be converted to electrical energy by the apparatus. In an embodiment, the wind turbine comprises three or four of such wind turbine blades.

According to a second aspect, a method for manufacturing a wind turbine blade for a wind turbine is proposed. The method comprises the steps of:

a) providing a fiber sock fully enclosing an electrical conductor when seen in cross-section,
b) providing a support element, and
c) connecting the fiber sock to the support element via at least one finger.

In an embodiment, the further electrical conductor is electrically connected to the lightning conductor.

A manufacturing method with such a fiber sock decreases the manufacturing effort due to a reduction of the complexity of the packaging process of the wind turbine blade.

According to an embodiment of the second aspect, the fiber sock, the support element and/or the at least one finger have a resin which is cured before the support element is connected to a blade shell of the wind turbine blade.

In particular, these components (also including the electrical conductor) are manufactured and assembled in a production plant (outside the wind turbine blade) and then, in a cured state, assembled inside the wind turbine blade, i.e., connected to the blade shell, for example.

According to a further embodiment of the second aspect, the fiber sock, the support element and/or the at least one finger have a resin which is cured after or at the same time as the support element is connected to a blade shell of the wind turbine blade.

Thereby, these components are manufactured integrally with the blade shell, for example.

The embodiments and features described with reference to the wind turbine blade of embodiments of the present invention apply mutatis mutandis to the method.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
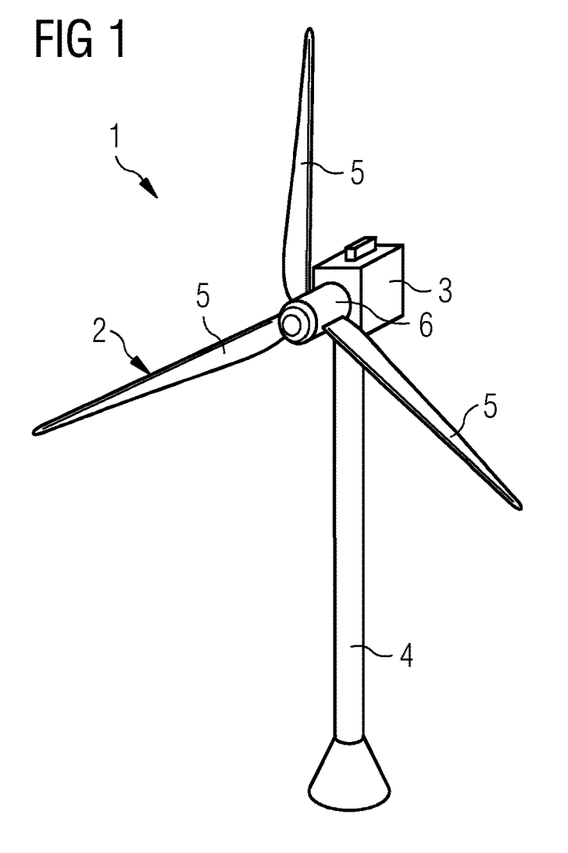
FIG. 1 shows a perspective view of a wind turbine according to one embodiment.

FIG. 1 shows a wind turbine 1. The wind turbine 1 comprises a rotor 2 connected to a generator (not shown) arranged inside a nacelle 3. The nacelle 3 is arranged at an upper end of a tower 4 of the wind turbine 1.

The rotor 2 comprises three wind turbine blades 5. The wind turbine blades 5 are connected to a hub 6 of the wind turbine 1. Rotors 2 of this kind may have diameters ranging from, for example, 30 to 200 meters or even more. The wind turbine blades 5 are subjected to high wind loads. At the same time, the wind turbine blades 5 need to be lightweight. For these reasons, wind turbine blades 5 in modern wind turbines 1 are manufactured from fiber-reinforced composite materials. Oftentimes, glass or carbon fibers in the form of unidirectional fiber mats are used.

Figure 2:
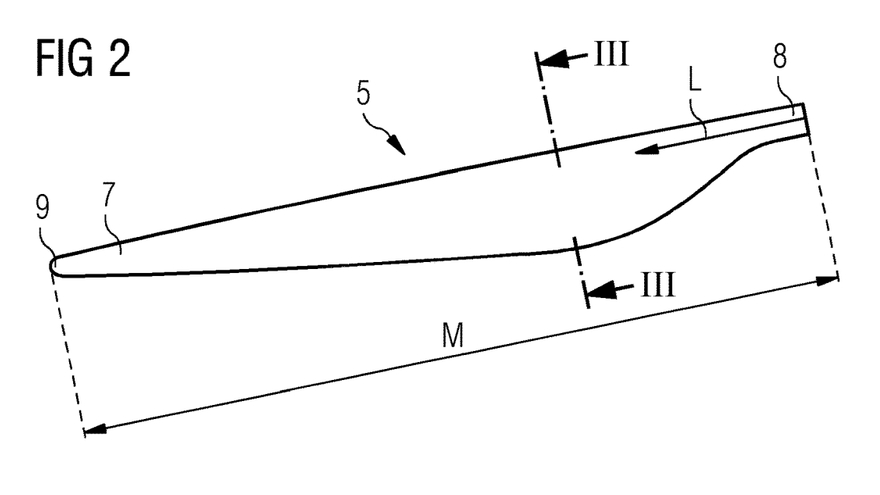
FIG. 2 shows a perspective view of a wind turbine blade of the wind turbine according to FIG. 1.

FIG. 2 shows a wind turbine blade 5. The wind turbine blade 5 comprises an aerodynamically designed portion 7 which is shaped for optimum exploitation of the wind energy and a blade root 8 for connecting the wind turbine blade 5 to the hub 6. Further, the wind turbine blade 5 comprises a blade tip 9, wherein the blade root 8 and the blade tip 9 face opposite sides. The wind turbine blade 5 extends in a lengthwise direction L. The wind turbine blade 5 has a length M which, for example, may be between 15 to 125 m.

Figure 3:
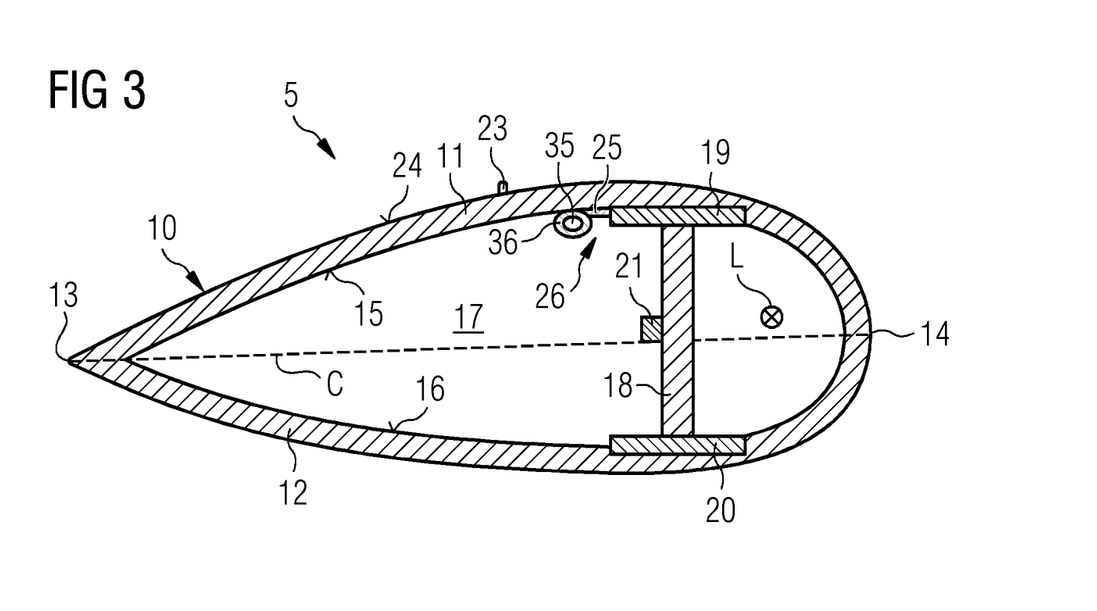
FIG. 3 shows schematically a cross-sectional view III-III from FIG. 2.

FIG. 3 shows schematically a cross-sectional view III-III from FIG. 2. All elements shown in FIG. 3 are shown simplified. It is understood that intermediate elements, in particular further connecting elements, reinforcement elements and shells, may be provided.

The wind turbine blade 5 comprises an outer blade shell 10 comprising a first half-shell 11 and a second half-shell 12 which are connected together at one side 13 of the wind turbine blade 5, in particular at a trailing edge, and at the other side 14 of the wind turbine blade 5, in particular at a leading edge, to form the outer shell 10 of the wind turbine blade 5.

A chord line C intersects the trailing edge and the leading edge. The blade shell 10 may comprises composite fiber material. Further, the first half-shell 11 and the second half-shell 12 may be adhesively bonded together. Alternatively, the blade shell 10 may be provided as a one-piece element. The first half-shell 11 comprises an inner surface 15 and the second half-shell 12 comprises an inner surface 16 being opposite to each other, wherein an inner space 17 of the wind turbine blade 5 is defined by the inner surfaces 15, 16.

A web 18, in particular a shear web, is located inside the inner space 17 extending from the inner surface 15 of the first half-shell 11 to the inner surface 16 of the second half-shell 12. The wind turbine blade 5 further comprises a support element 19, in particular a first carbon fiber reinforced beam and/or spar cap, connected to the first half-shell 11 and a support element 20, in particular a second carbon beam and/or spar cap, connected to the second half-shell 12.

In particular, the support elements 19, 20 (in particular spar cabs) are electrically conductive and extend along the lengthwise direction L (FIG. 2) of the blade 5 which corresponds to the spanwise direction. In an embodiment, the web 18 also extends along the lengthwise direction L.

In an embodiment, the web 18 is located between the support element 19 and the support element 20, wherein the web 18 and the support elements 19, 20 are forming an I-shaped cross section. The web 18 and the support elements 19, 20 are forming a support structure preventing breaking or crippling of the wind turbine blade 5. Alternatively, or additionally, the support element 19, 20 may be provided near to the trailing edge or near to the leading edge of the wind turbine blade 5.

Further, a lightning conductor 21 is provided extending along the lengthwise direction L and being attached to the web 18. The lightning conductor 21 is arranged between the support elements 19, 20. In an embodiment, the lightning conductor 21 is a down conductor. In particular, the lightning conductor 21 is a metal cable. Further, the lightning conductor 21 is grounded at the tower base. A plurality of receptors 23 may be provided at the outer surface 24. The receptors 23 and the conductor 21 form a lightning protection system (LPS).

Further, a fiber sock 36 which fully encloses an electrical conductor 35. Both extend in the lengthwise direction L and are provided inside the inner space 17. In an embodiment, the electrical conductor 35 is connected via the fiber sock 36 to the inner surface 15. In particular, a receptor 23 (lighting rod or air terminal) is arranged at an outer surface 24 of the blade 5. In an embodiment, the receptor 23 is directly or indirectly electrically connected to the electrical conductor 35 via the fiber sock 36. The support element 19 is electrically connected to the lightning conductor 21 via the at least one finger 25, the fiber sock 36 and the electrical conductor 35. A carbon fiber part of the support element 19 is connected to the at least one finger 25 which is connected to carbon fibers of the fiber sock 36. The fiber sock 36 encloses and is thereby connected to the electrical conductor 35. The fiber sock 36 comprises multiaxial carbon fibers, in particular triaxial carbon fibers.

The at least one finger 25 is directly electrically connected to the fiber sock 36 of the electrical conductor 35. The electrical conductor 35 is a metal (e.g., copper or aluminum) cable. Furthermore, the at least one finger 25 is attached and, thus, directly electrically connected to the support element 19. In an embodiment, the electrical conductor 35 with the fiber sock 36 is electrically connected between the at least one finger 25 and the lighting conductor 21 on the web 18.

Thus, the wind turbine blade 5 of the wind turbine 1 comprises the electrical conductor 35 configured to conduct lighting strikes towards the tower 4, the fiber sock 36 which fully encloses the electrical conductor 35 when seen in cross-section, the at least one blade shell 10, the support element 19 for supporting the at least one blade shell 10, and the at least one finger 25 which connects the support element 19 and the fiber sock 36 together. The support element 19 and the at least one finger 25 being made of electrically conductive fibers 27 for conducting lightning strikes from the at least one blade shell 10 to the electrical conductor 35.

Figure 4:
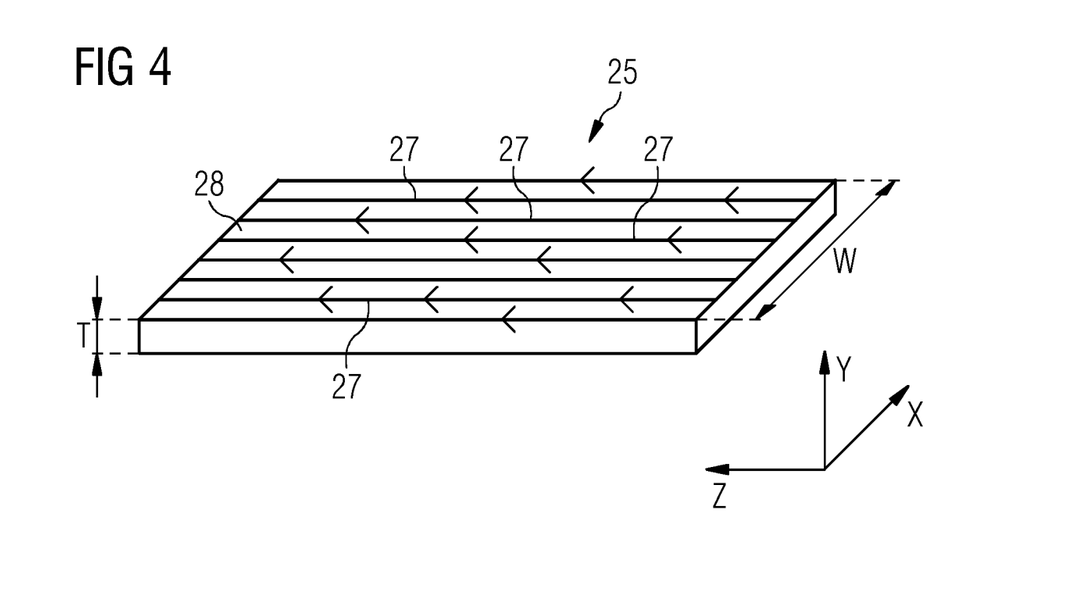
FIG. 4 shows schematically a perspective view of electrically conductive fibers.

FIG. 4 shows schematically a perspective view of electrically conductive fibers 27. In particular, the support element 19 and the at least one finger 25 comprise such electrically conductive fibers 27. In particular, the electrically conductive fibers 27 are unidirectional carbon fibers and, in particular, are continuous carbon fibers. In an embodiment, the electrically conductive fibers 27 are embedded in a matrix 28, for example plastic material, in particular resin. The electrically conductive fibers 27 extend parallel to a direction Z in a unidirectional direction which is perpendicular to a direction X and a direction Y. The direction Z is indicated in FIG. 4 by arrow tips. Further, the electrically conductive fibers 27 run straight. Each electrically conductive fiber 27 may be a single fiber or a fiber bundle. A thickness T of the electrically conductive fibers 27 extends in the direction Y. A width W of the electrically conductive fibers 27 extends in the direction X.

In particular, the electrical conductivity in the direction Z which is the extension direction of the electrically conductive fibers 27 is many times larger than the conductivities in the direction X and the direction Y. This illustrates an anisotropy of the electrically conductive fibers 27. The unidirectional electrically conductive fibers 27 are the main reason for a sufficient electrical conductivity of the electrically conductive fibers 27.

Figure 5:
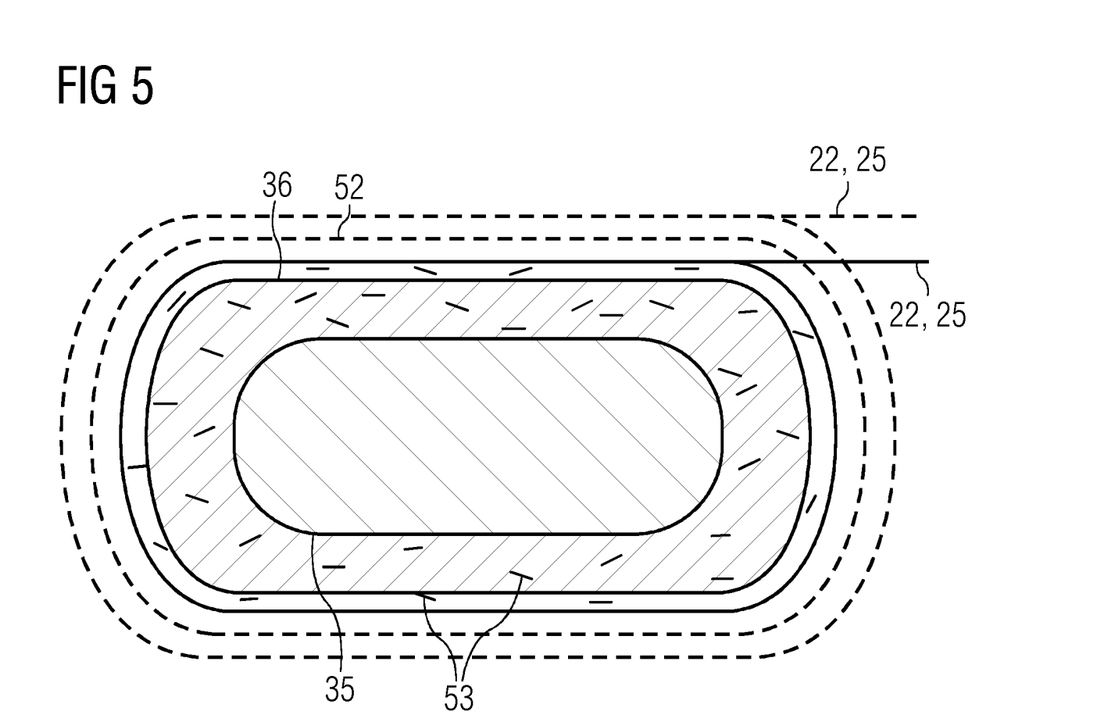
FIG. 5 shows schematically a cross-section of the fiber sock comprising the electrical conductor.

FIG. 5 shows schematically a cross-section of the fiber sock 36 comprising the electrical conductor 35. The fiber sock 36 fully enclosing the electrical conductor 35 when seen in cross-section. There is also shown one end of the finger 25 wrapped around the fiber sock 36. A cured resin 53 adheres components 25, 35 and 36 together. In dashed lines, an embodiment with a further (second) fiber sock 52 is shown fully enclosing the first fiber sock 36 in cross-section. In this case, the finger 25 is connected to the second fiber sock 52.

Figure 6:
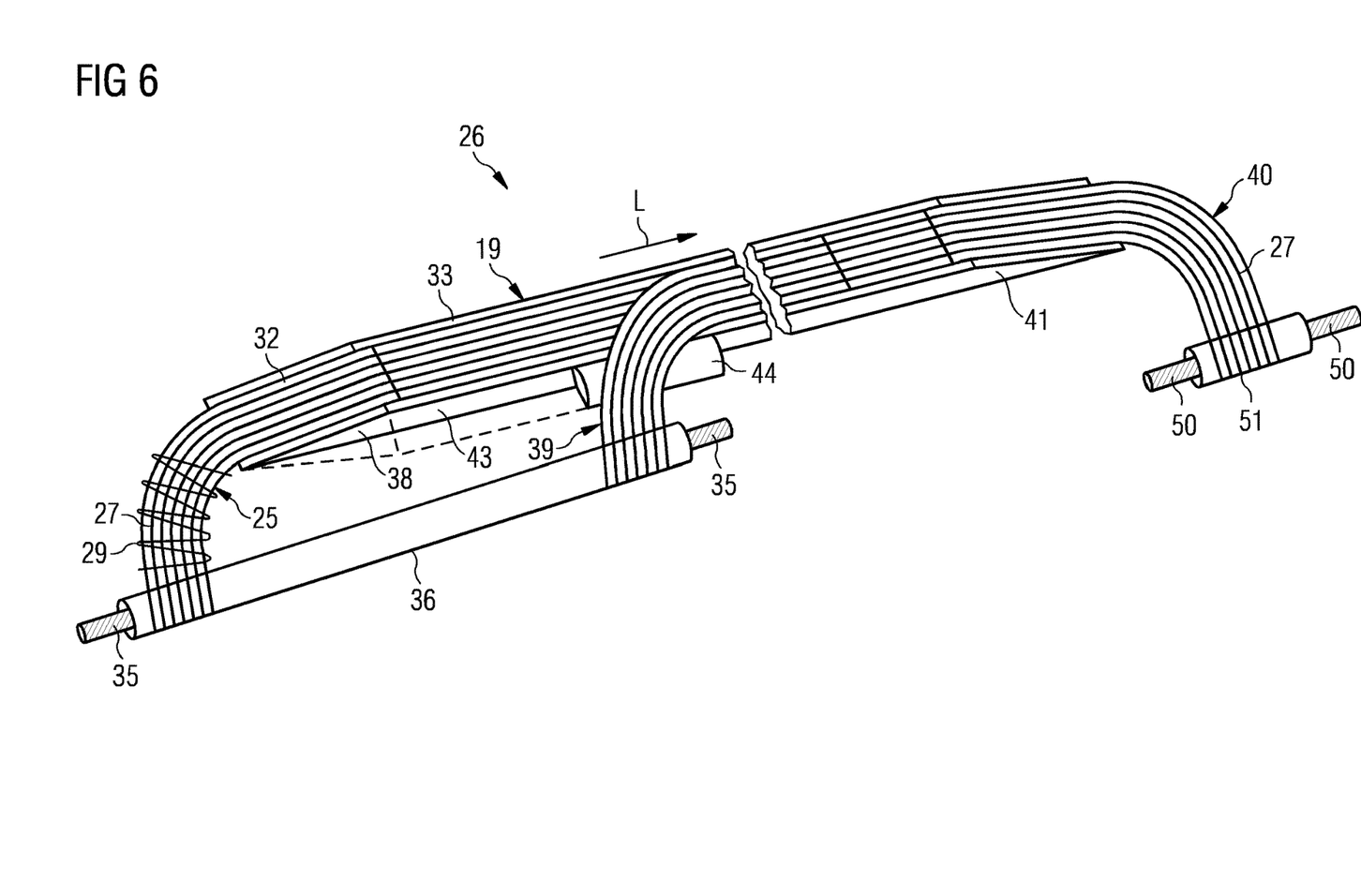
FIG. 6 shows schematically a perspective view of an electrical connecting arrangement of the wind turbine blade according to FIG. 2.

FIG. 6 shows schematically a perspective view of an electrical connecting arrangement 26 of the wind turbine blade 5 according to FIG. 2. The support element 19 is a spar cap comprising carbon fiber reinforced polymer material (CFRP) as well as unidirectional carbon fibers.

The electrical arrangement 26 comprises at least two fingers 25, 39 both being electrically conductive and connecting the support element 19 and the fiber sock 36. FIG. 6 includes a further finger 40 (third finger) which is electrically conductive and connecting the support element 19 and further fiber sock 51. The fiber sock 36 fully encloses the electrical conductor 35 over the full length between the at least two fingers 25, 39 when seen in cross-section. Also, the further fiber sock 51 fully encloses a further electrical conductor 50. The electrical conductor 35 and the fingers 25 and 39 are arranged near to the blade root 8 (see FIG. 2) and the further electrical conductor 50 and the third finger 40 are arranged near to the blade tip 9 (see FIG. 2).

In an embodiment, an end portion 38 of the support element 19 is wedge-shaped. An overlapping portion 32 is provided at the end portion 38. In particular, another end portion 41 of the support element 19 is also wedge-shaped. The third finger 40 is connected to the other end portion 41.

Further, the electrical conductor 35 and the second finger 39 are provided as a mid-connection arranged between the first finger 25 and the third finger 40. The electrical conductor 35 and the further electrical conductor 50 may be provided as a one-piece conductor, in particular an LPS-cable and/or the lightning conductor 21 (see FIG. 3). In an embodiment, the electrical conductor 35 and the further electrical conductor 50 are connected to the lighting conductor 21. Alternatively, the conductors 35 and 50 may be provided as separate conductors.

The second and third fingers 39, 40 may be connected to the support element 19 as described for the first finger 25. The broad side 33 may be provided as broadest side of the support element 19. The support element 19 further comprises a narrow side 43, wherein the broad side 33 is several times larger than the narrow side 43. Thus, the support element 19 is provided as a flat element. In an embodiment, the support element 19 has a rectangular cross-sectional shape. In an embodiment, which is not shown in the figures, at least four fingers (e.g., one finger corresponds to the at least one finger) extend from the end portion 38 of the support element 19 and electrically connect the end portion 38 with the fiber sock 36 and/or the further fiber sock 51, at least two fingers extend from the center of the support element 19 and electrically connect the center of the support element 19 with the fiber sock 36 and/or the further fiber sock 51 and/or at least four fingers extend from the end portion 41 of the support element 19 and electrically connect the end portion 41 with the fiber sock 36 and/or the further fiber sock 51.

Optionally, a core insert 44 may be provided which is attached to the narrow side 43. The electrical conductor 35 of the mid-connection is arranged parallel and offset to the broad side 33.

In an embodiment, the core insert 44 is provided over the complete length of the support element 19. In an embodiment, the fiber socks 36, 51 of the electrical conductors 35, 50 are connected to the second and third fingers 39, 40 as described for the fiber sock 36 of the electrical conductor 35 and the first finger 25.

In an embodiment, at least the at least one finger 25 or more fingers 39, 40 comprise a weft thread 29 which extends between the support element 19 and the fiber sock 36 for holding together the electrically conductive fibers of the at least one finger 25.

Figure 7:
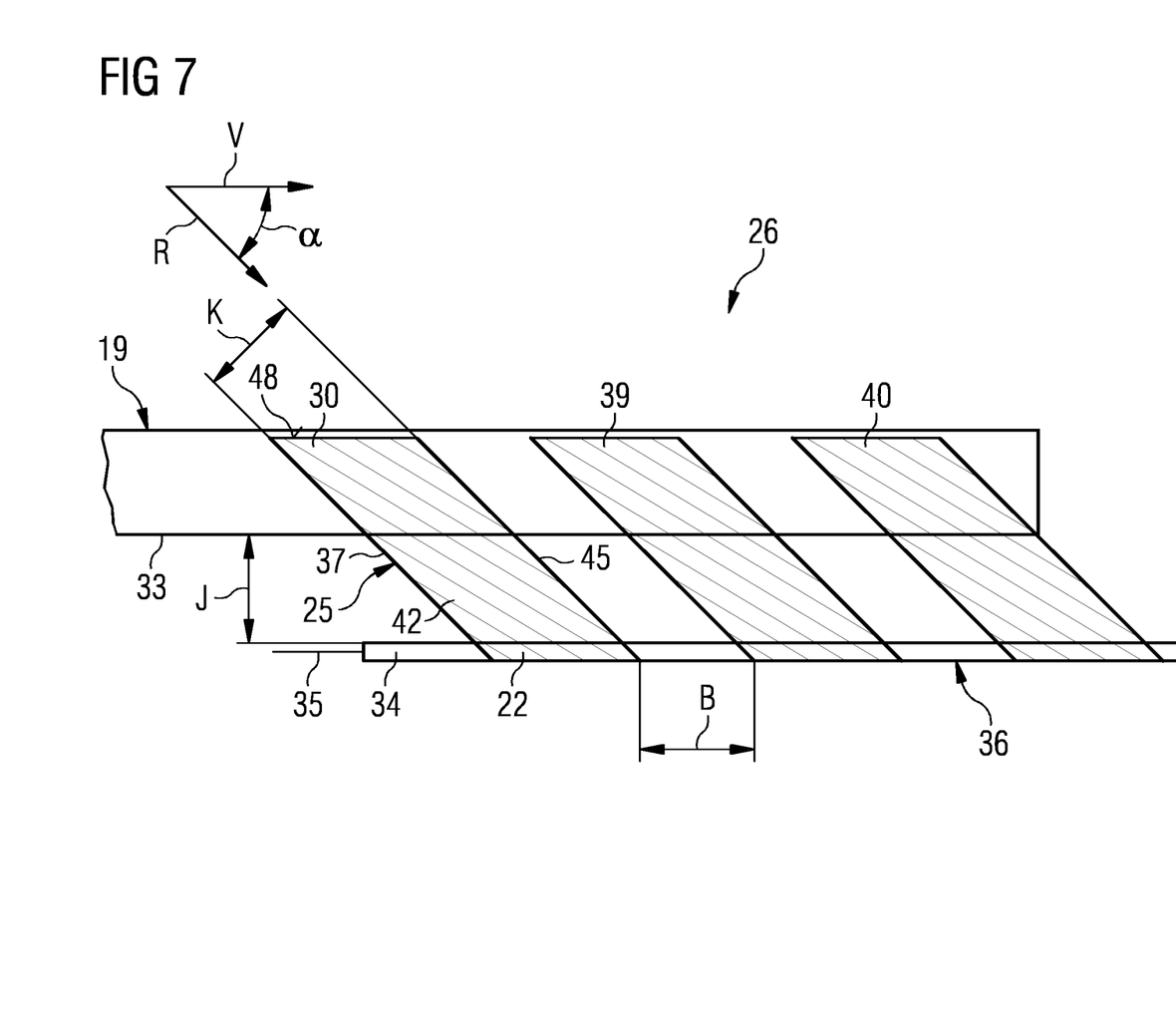
FIG. 7 shows schematically a top view of the electrical connecting arrangement of the wind turbine blade according to FIG. 2.

FIG. 7 shows schematically a top view of the electrical connecting arrangement 26 of the wind turbine blade 5 according to FIG. 2. In an embodiment, the top view means a view perpendicular to the lengthwise direction L.

The first finger 25 comprises a portion 42 (also referred as first portion) which is arranged beside the fiber sock 36, a portion 22 (also referred as second portion) which is connected to the portion 42 and is attached and electrically connected to the fiber sock 36 and a portion 30 (also referred as third portion) which is attached and electrically connected to the support element 19. In an embodiment, the portions 22, 30 and 42 are formed by a one-piece unidirectional carbon fiber mat.

The portion 42 is arranged between the fiber sock 36 and the support element 19. Further, the portion 42 is rhombus-shaped, for example. The second portion 22 of the first finger 25 fully encloses the fiber sock 36 (wrapped around the same).

As shown in FIG. 7, the support element 19 is arranged beside the fiber sock 36. A distance J between the support element 19 and the fiber sock 36 is between 10 mm and 3000 mm or larger than 150 mm. In particular, the distance J is measured between a side edge 33 of the support element 19 adjacent to the portion 42 and an edge 34 of the fiber sock 36 adjacent to the portion 42. The edges 33 and 34 face towards each other.

The portion 30 completely overlaps with the support element 19. Thus, a sufficient attaching area between the first finger 25 and the support element 19 is provided. This ensures an even distribution of the current when conducting a lightning strike. Therefore, arcing between and at the support element 19 and the first finger 25 may be avoided when transferring the current and, thus, delamination may be prevented. The portion 30 is rhombus-shaped.

A finger width K which is measured between two side edges 37, 45 of the first finger 25 is between 100-500 mm, in particular 200 mm. The support element 19 comprises a main (spanwise) extension direction V (also referred as first main extension direction) and the first finger 25 comprises a main extension direction R (also referred as second main extension direction), wherein an angle α between the main extension direction V and the main extension direction R is between 30 and 60° or 40 and 50°, in particular 45°. In an embodiment, the angle α is also or alternatively provided between the broad side 33 and the side edge 45. The side edges 37, 45 extend parallel to the main extension direction W.

Further, at least three fingers 25, 39, 40 are provided parallel to each other. In particular, the at least three fingers 25, 39, 40 are provided identically and are identically attached to the fiber sock 36. A second finger 39 is arranged beside the first finger 25, wherein a distance B between the first and the second finger 25, 39 is less than 500 mm, less than 400 mm, less than 300 mm, or less than 200 mm and/or larger than 50 mm or larger than 100 mm. A third finger 40 is arranged beside the second finger 39, wherein the distance B is also provided between the second and third fingers 39, 40.

In an embodiment, the electrical conductor 35 is a cable having a flat shape in order to have a good pressure distribution during manufacturing at interfaces with the at least three fingers 25, 39, 40. In an embodiment, the electrical conductor 35 has a rectangular cross-section (shown in FIG. 5).

In particular, the support element 19 and fiber sock 36 are electrically connected by at least one, two, three or four fingers 25, 39, 40 (only three are shown in FIG. 7). In an embodiment, the support element 19 and fiber sock 36 are electrically connected by more than four fingers, for example five, six, seven, eight, nine, ten or more than ten fingers.

Figure 8:
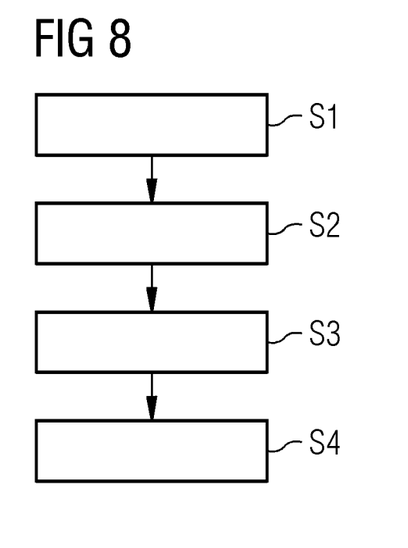
FIG. 8 shows the steps of a method for manufacturing a wind turbine blade for a wind turbine according to FIG. 1.

FIG. 8 shows the steps of a method for manufacturing a wind turbine blade 5 for a wind turbine 1 according to FIG. 1. The method of FIG. 8 comprises the steps S1 to S4.

In step S1, the fiber sock 36 fully enclosing the electrical conductor 35 when seen in cross-section is provided. Further, in step S2, the support element 19 is provided. In step S3, the fiber sock 36 is connected to the support element 19 via the at least one finger 25. In step S4, the electrical conductor 35 is connected to a lighting conductor 21.

According to an embodiment of the method according to FIG. 8, the fiber sock 36, the support element 19 and/or the at least one finger 25 have a resin which is cured before the support element 19 is connected to the blade shell 10.

According to another embodiment of the method according to FIG. 8, the fiber sock 36, the support element 19 and/or the at least one finger 25 have a resin which is cured after or at the same time as the support element 19 is connected to the blade shell 10.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade for a wind turbine, the wind turbine blade comprising:
    an electrical conductor for conducting lighting strikes towards a hub of the wind turbine;
    a fiber sock fully enclosing the electrical conductor when seen in cross-section,
    a support element and;
    at least one finger connecting the support element and the fiber sock wherein the fiber sock, the support element, and the at least one finger being made of electrically conductive fibers for conducting lightning strikes from the support element to the electrical conductor.

2. The wind turbine blade according to claim 1, wherein the fiber sock comprises multiaxial carbon fibers.

3. The wind turbine blade according to claim 1, comprising at least two fingers both being made from electrically conductive fibers and connecting the support element and the fiber sock, wherein the fiber sock fully encloses the electrical conductor when seen in cross-section and over a full length between the at least two fingers.

4. The wind turbine blade according to claim 1, wherein a distance between the support element and the electrical conductor is between 10 mm and 3000 mm, or larger than 150 mm.

5. The wind turbine blade according to claim 3, wherein a distance between the at least two fingers is less than 500 mm, less than 400 mm, less than 300 mm, or less than 200 mm and/or larger than 50 mm or larger than 100 mm.

6. The wind turbine blade according to claim 1, wherein the at least one finger is made of electrically conductive unidirectional carbon fibers.

7. The wind turbine blade according to claim 1, comprising a further fiber sock which fully encloses the fiber sock when seen in cross-section, the at least one finger being connected to the fiber sock via the further fiber sock.

8. The wind turbine blade according to claim 1, wherein the at least one finger comprises a weft thread which extends between the support element and the fiber sock for holding together the electrically conductive fibers of the at least one finger.

9. The wind turbine blade according to claim 1, wherein the support element is a spar cap.

10. The wind turbine blade according to claim 1, wherein the electrical conductor is a metal cable, extending in a lengthwise direction of the wind turbine blade.

11. A wind turbine comprising the wind turbine blade according to claim 1.

\* \* \* \* \*